(12) United States Patent
Okano et al.

(10) Patent No.: US 11,485,406 B2
(45) Date of Patent: Nov. 1, 2022

(54) STEERING SYSTEM FOR VEHICLES

(71) Applicant: Toyota Jidosha Kabushiki Kaisha, Toyota (JP)

(72) Inventors: Takahiro Okano, Chiryu (JP); Takafumi Sato, Obu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 385 days.

(21) Appl. No.: 16/784,891

(22) Filed: Feb. 7, 2020

(65) Prior Publication Data

US 2020/0283058 A1 Sep. 10, 2020

(30) Foreign Application Priority Data

Mar. 5, 2019 (JP) .............................. JP2019-039803

(51) Int. Cl.
*B62D 5/04* (2006.01)
*B62D 5/00* (2006.01)

(52) U.S. Cl.
CPC ........... *B62D 5/0421* (2013.01); *B62D 5/001* (2013.01)

(58) Field of Classification Search
CPC ............................. B62D 5/001; B62D 5/0421
See application file for complete search history.

(56) References Cited

U.S. PATENT DOCUMENTS

| 2008/0156572 | A1* | 7/2008 | Kasahara | F16D 28/00 180/402 |
| 2008/0162001 | A1* | 7/2008 | Chai | B62D 6/008 701/42 |
| 2012/0306426 | A1 | 12/2012 | Ikeda et al. | |
| 2015/0175199 | A1* | 6/2015 | Kuramochi | B62D 5/008 701/41 |
| 2015/0203152 | A1* | 7/2015 | Katayama | B62D 6/04 701/41 |
| 2015/0291208 | A1* | 10/2015 | Miyasaka | B62D 5/046 701/41 |

FOREIGN PATENT DOCUMENTS

| JP | 2003-118618 A | 4/2003 |
| JP | 2005-225354 A | 8/2005 |
| JP | 2005-225355 A | 8/2005 |
| JP | 2018-183046 A | 11/2018 |

* cited by examiner

*Primary Examiner* — Rina I Duda
(74) *Attorney, Agent, or Firm* — Dinsmore & Shohl LLP

(57) ABSTRACT

A steering system for a vehicle according to an example in the present disclosure includes a steering mechanism that is mechanically disconnected from a steering wheel to cause a driving wheel to be turned by a turning motor, and a control device that provides a motor command value to the turning motor. The control device has a two-degree-of-freedom control system including a feed-forward model for converting a target turning angle into a feed-forward value of the motor command value, and a feedback model for converting a difference between the target turning angle and an actual turning angle into a feedback value of the motor command value. A transfer function describing the feed-forward model contains a variable coefficient. The control device changes the variable coefficient of the transfer function based on information about road surface reaction.

17 Claims, 5 Drawing Sheets

STEERING SYSTEM FOR VEHICLES

CROSS-REFERENCE TO RELATED APPLICATION

The present application claims priority under 35 U.S.C. § 119 to Japanese Patent Application No. 2019-039803, filed Mar. 5, 2019. The contents of this application are incorporated herein by reference in their entirety.

TECHNICAL FIELD

A present disclosure relates to a steering system for a vehicle of a steer-by-wire system.

BACKGROUND

JP2005-225355A discloses, in a steering system for a vehicle of a steer-by-wire system, an example of controlling a turning motor by a two-degree-of-freedom control system. In the conventional two-degree-of-freedom control system disclosed herein, moment of inertia around a turning shaft including a motor, a transmission, a steering rack, a tie rod, tires, and the like, and the viscosity coefficient around the turning shaft are incorporated into a feed forward model.

However, in the conventional two-degree-of-freedom control system, when running environmental conditions change, the deviation between the feed-forward model and actual control object is expanded, and the accuracy of turning control may be impaired.

SUMMARY

A present disclosure has been made in view of the above problems, and an object of an example in the present disclosure is to provide a steering system for a vehicle of a steer-by-wire system capable of ensuring the accuracy of the turning control when changing running environmental conditions.

A steering system for a vehicle according to an example in the present disclosure includes a steering mechanism that is mechanically disconnected from a steering wheel to cause a driving wheel to be turned by a turning motor, and a control device that provides a motor command value to the turning motor. The control device has a two-degree-of-freedom control system including a feed-forward model for converting a target turning angle into a feed-forward value of the motor command value, and a feedback model for converting a difference between the target turning angle and an actual turning angle into a feedback value of the motor command value. A transfer function describing the feed-forward model contains a variable coefficient. The control device changes the variable coefficient of the transfer function based on information about road surface reaction.

According to the above configuration, when a change occurs in road surface reaction due to a change in running environment conditions, the variable coefficient of the transfer function describing the feed-forward model is changed according to the change in the road surface reaction. Thus, the expansion of the deviation between feed-forward model and control object with the change of the running environment conditions is suppressed.

When the feedback value becomes a predetermined value or more, the control device may change the variable coefficient of the transfer function based on the information about the road surface reaction. In other words, the change of the variable coefficient of the transfer function may be performed after the feedback value becomes the predetermined value or more. Thus, it is possible to prevent the variable coefficient from being changed frequently when the deviation between the feed-forward model and the control object is small, and to ensure the stability of the control.

The control device may limit change speed of the variable coefficient of the transfer function to a predetermined upper limit or less. By setting a limit to the change speed of the variable coefficient, it is possible to prevent a sudden change in vehicle behavior. Further, when change speed of the target turning angle is a predetermined value or less, the control device may increase maximum change speed of the variable coefficient in a range that does not exceed the upper limit in accordance with the change speed of the target turning angle.

When the vehicle is stopped or when the lateral acceleration acting on the vehicle is in a saturation region, stability is given priority over responsiveness to the turning control. In such a case, the control device, after stopping the change of the variable coefficient of the transfer function, may limit a feedback value to a predetermined upper limit or less. Thus, it is possible to maintain the stability of the turning control. When the change speed of the target turning angle is equal to or less than the predetermined value, the control device may increase a maximum value of the feedback value in a range that does not exceed the upper limit in accordance with the change speed of the target turning angle.

According to the steering system for a vehicle according to an example present disclosure, when a change occurs in the road surface reaction due to a change in the running environment conditions, the variable coefficient of the transfer function describing the feed-forward model is changed in accordance with a change in the road surface reaction. Thus, since the expansion of the deviation between the feed-forward model and the control object due to the change of the running environment conditions is suppressed, it is possible to ensure the accuracy of the turning control with respect to the change of the running environment conditions.

DESCRIPTION OF EMBODIMENTS

Embodiments of the present disclosure will be described with reference to drawings. However, when referring to the number of each element, quantity, quantity, range, etc. in the embodiments shown below, the disclosure is not limited to the number mentioned, unless specifically indicated or clearly specified in principle. Further, structures or the like described in the embodiments are not necessarily essential to the present disclosure, except when explicitly indicated or clearly specified therein.

Figure 1:
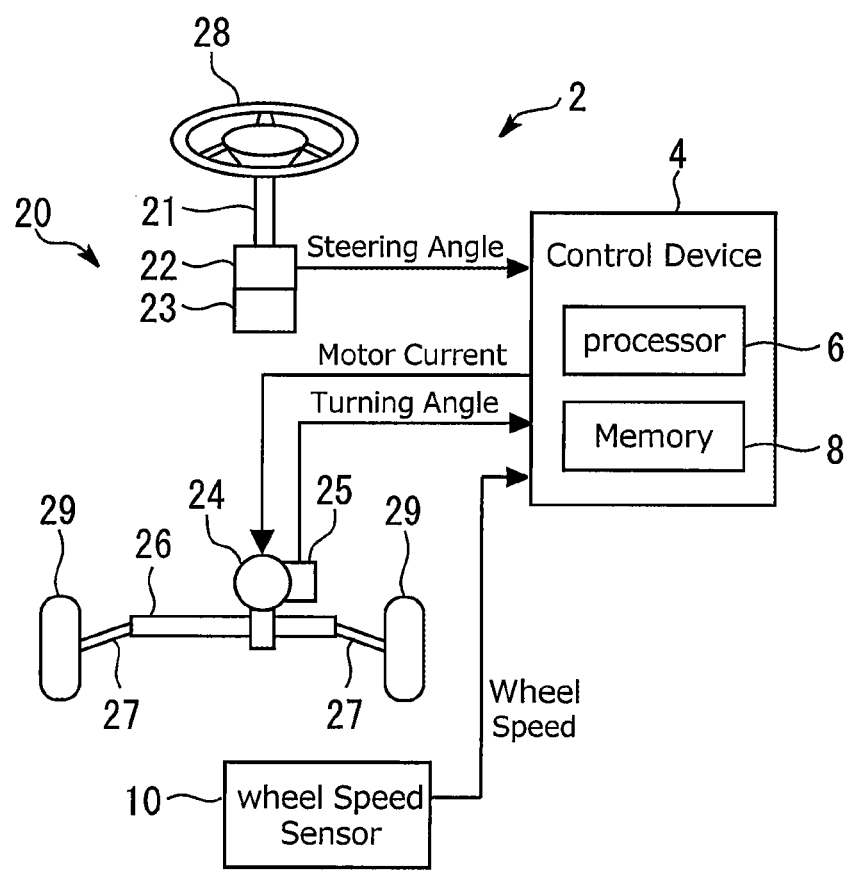
FIG. 1 is a diagram illustrating a construction of a steering system for a vehicle according to an embodiment of the present disclosure.

FIG. 1 is a diagram illustrating a configuration of a vehicle steering system 2 according to an embodiment of the present disclosure. Vehicle steering system 2 includes a steering mechanism 20. The steering mechanism 20 is a steering mechanism of a steer-by-wire system in which a driving wheel 29 can be turned by a turning motor 24 without being mechanically connected with a steering wheel 28. The steering wheel 28 is a steering member to which a steering operation by a driver is input. The steering wheel 28 is coupled to a reaction motor 23 via a steering shaft 21. The reaction motor 23 applies a reaction force to the steering wheel 28 corresponding to a turning angle of the driving wheel 29. The steering shaft 21 is provided with a steering angle sensor 22 which outputs a signal according to a rolling angle, that is, a steering angle, of the steering wheel 28.

The turning motor 24 is mounted to a rack shaft 26 via a reduction mechanism (not shown). The rack shaft 26 is not mechanically coupled to the steering shaft 21. The driving wheel 29 is coupled to the rack shaft 26 via a tie rod 27. Rotating the turning motor 24 causes the rack shaft 26 to move linearly in its axial direction, thereby changing the turning angle of the driving wheel 29 through the tie rod 27. The turning motor 24 is provided with a turning angle sensor 25 which outputs a signal according to the turning angle of the turning wheel 29.

The vehicle steering system 2 includes a control device 4. The control device 4 is an ECU (Electronic Control Unit) having at least one processor 6 and at least one memory 8. The memory 8 stores various data including a map and various programs which are used for turning control. By the processor 6 reads and executes a program from the memory 8, various functions related to the turning control are realized in the control device 4.

The control device 4 controls, by controlling the motor current supplied to the turning motor 24, torque for the turning control applied from the turning motor 24 to the rack shaft 26. Various sensors for measuring physical quantities relevant to the turning control are connected to the control device 4 directly or via a communication network constructed in the vehicle. Such sensors include at least the steering angle sensor 22, the turning angle sensor 25, and a wheel speed sensor 10.

Figures 2, 3:
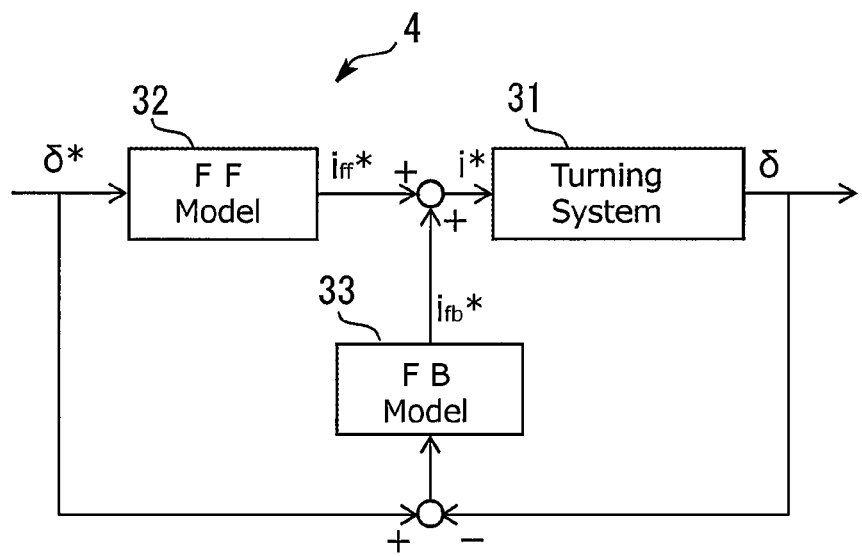
FIG. 2 is a block diagram illustrating a control system of a steering system for a vehicle according to an embodiment of the present disclosure.
FIG. 3 is a model of the turning system.

FIG. 2 is a block diagram illustrating a control system of the vehicle steering system 2 according to this embodiment. The plant (controlled object) in this control system is a turning system 31 for turning the driving wheel 29 according to target motor current determined by the control device 4. The turning system 31 includes a motor driver (not shown) that supplies the motor current to the turning motor 24 in accordance with the target motor current, a turning motor 24, a torque transmission mechanism that transmits the torque of the turning motor 24 to the rack shaft 26, and the driving wheel 29.

The turning system 31 may be modeled as shown in FIG. 3. First, in the turning system 31, the motor current is output from the motor driver to the turning motor 24 according to the target motor current. When the time constant of the control response of the motor current is τ, the relationship between the motor current i and the target motor current i* is expressed by the following equation. Incidentally, the time constant τ of the control response is a fixed value, specifically a value of about 0.001 seconds.

$$i=(1/(1+\tau s))\times i^*$$

Next, in the turning system 31, the motor current is converted to motor torque in the turning motor 24. When motor torque coefficient is taken as a $K_1$, relation between the motor torque $T_M$ and the motor current i is expressed by the following equation. Incidentally, the motor torque coefficient $K_1$ is a fixed value, specifically a value of about 0.02-0.05 Nm/A.

$$T_M = K_1 \times i$$

Next, in the turning system 31, the motor torque of the turning motor 24 is converted into a rack torque of the rack shaft 26 in a torque transmission mechanism from the turning motor 24 to the rack shaft 26. When the gear ratio is taken as a $K_G$, relation between the rack torque $T_R$ and the motor torque $T_M$ is expressed by the following equation. The gear ratio $K_G$ is a fixed value, specifically a value of about 10 to 30.

$$T_R = K_G \times T_M$$

Next, in the turning system 31, the driving wheel 29 is turned by the rack torque of the rack shaft 26. The relationship between the rack torque and the turning angle of the driving wheel 29 at that time depends on the road surface reaction received by the driving wheel 29 from the road surface. When the road surface reaction coefficient is taken as a $K_2$, the relation between the turning angle δ and the rack torque $T_R$ is expressed by the following equation. The specific value of the road surface reaction coefficient $K_2$ is, for example, such that the rack torque $T_R$ is about 10000 Nm when the turning angle δ is 30 degrees on a dry road surface, assuming that the rack stroke is 80 mm.

$$\delta = (1/(K_2 \times s^2))T_R$$

Accordingly, the model of the turning system 31 can be expressed by the following transfer function.

Turning control system model: $((K_1 \times K_G)/(K_2 \times s^2)) \times (1/(1+\tau s))$ Referring to FIG. 2, the control system of the vehicle steering system 2 according to the present embodiment will continue to be described. The control system is composed of the turning system 31 capable of being modeled as described above, and a control device 4 having a two-degree-of-freedom control system including a feed forward model 32 and a feedback model 33.

In the feed-forward model 32, a feed-forward value $i_{ff}^*$ of the target motor current i* is calculated from the target turning angle δ*. The feed-forward model 32 may be represented by, for example, the following transfer function when the turning system 31 is modeled as described above.

Feed-forward Model: $K_1/(K_2 \times K_G \times s^2)$

In the feedback model 33, a feedback value $i_{fb}^*$ of the target motor current i* is calculated from the difference between the target turning angle δ* and the actual turning angle δ. If the feedback control is, for example, PD control, the feedback model 33 can be represented by the following transfer function. $K_P$ is the proportional gain and τ D is the derivative time.

Feedback model: $K_P \times (1+\tau_D \times s)$

The feedback value $i_{fb}^*$ calculated by the feedback model 33 is added to the feed-forward value $i_{ff}^*$ calculated by the feed-forward model 32, and the target motor current i*, which is the sum value of the feedback value $i_{fb}^*$ and the feed-forward value $i_{ff}^*$, is given to the turning motor 24 as a motor command value. However, the motor command value may not necessarily be a current. For example, the target value of the motor torque generated by the turning motor 24 may be a motor command value.

As described above, the transfer function of the feed-forward model 32 includes the road surface reaction coefficient $K_2$. In the feed-forward model 32, the road surface reaction coefficient $K_2$ is treated not as a fixed value but as a variable coefficient that can vary depending on the running environment conditions. The control device 4 changes the road surface reaction coefficient $K_2$ based on the information acquired by the information acquisition device such as the wheel speed sensor 10 and the turning angle sensor 25. Information acquired by the information acquisition device is information on road surface reaction, including, for example, vehicle speed, a road surface friction coefficient, turning angle, operating state of ABS and VSC, and the like. Hereinafter, the setting of the road surface reaction coefficient $K_2$ for the respective information will be concretely described.

Figure 4:
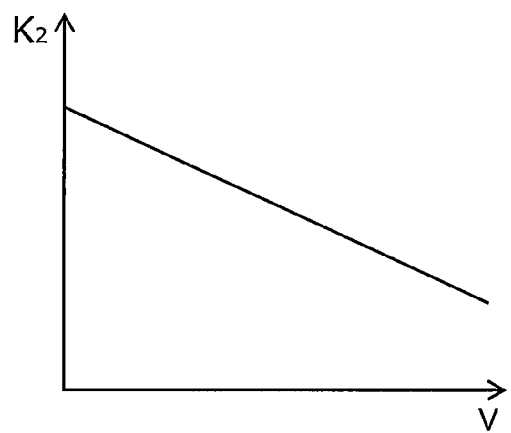
FIG. 4 is a diagram illustrating an example of setting a coefficient $K_2$ of road surface reaction.

FIG. 4 is a diagram illustrating an example of setting the road surface reaction coefficient $K_2$ with respect to the vehicle speed V. The lower the vehicle speed, the greater the inertial of the driving wheel 29, and the driving wheel 29 becomes difficult to follow the change in the rack torque of the rack shaft 26. Therefore, the control device 4 sets the road surface reaction coefficient K to a larger value as the vehicle speed V is lower, as shown in FIG. 4, when the other conditions are certain. In the present embodiment, the vehicle speed is measured using the signal of the wheel speed sensor 10.

Figure 5:
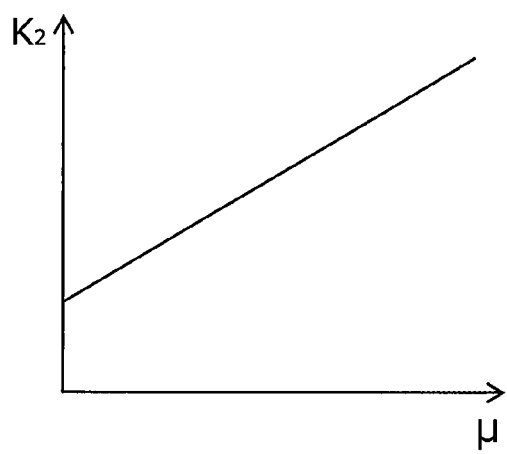
FIG. 5 is a diagram illustrating another example of setting a coefficient $K_2$ of road surface reaction force.

FIG. 5 is a diagram illustrating an example of setting the road surface reaction coefficient $K_2$ with respect to the road surface friction coefficient μ. The lower the road surface friction coefficient, the driving wheel 29 becomes slippery, and the driving wheel 29 is easy to follow the change of the rack torque of the rack shaft 26. Therefore, the control device 4, when the other conditions are certain, the lower the road surface friction coefficient g sets the road surface reaction coefficient $K_2$ to a smaller value, as shown in FIG. 5. It is necessary to estimate the road surface friction coefficient because it cannot be directly measured, but the estimation method is not limited. For example, the road surface friction coefficient may be estimated from the information about the road surface condition acquired by the navigation system, or the road surface friction coefficient may be estimated using the sensor information acquired by the vehicle sensor such as the wheel speed sensor 10.

Figure 6:
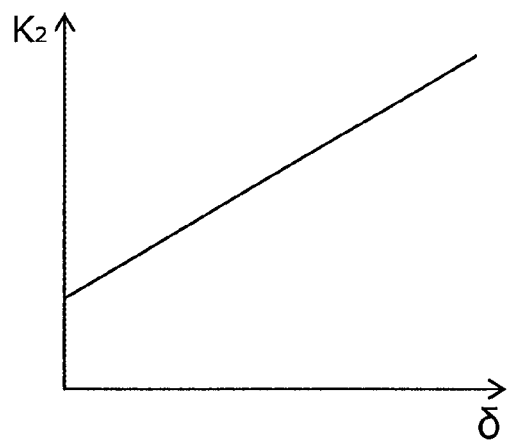
FIG. 6 is a diagram illustrating another example of setting a coefficient $K_2$ of road surface reaction force.

FIG. 6 is a diagram illustrating an example of setting of the road surface reaction coefficient $K_2$ with respect to the turning angle δ. Since the torsional force acting on the driving wheel 29 increases as the turning angle δ increases, the driving wheel 29 becomes difficult to follow the change of the rack torque of the rack shaft 26. Therefore, when the other conditions are constant, the control device 4 sets the road surface reaction coefficient $K_2$ to a larger value as the turning angle δ is larger, as shown in FIG. 6. In the present embodiment, the turning angle δ is measured using the signal of the turning angle sensor 25.

The control device 4, when ABS or VSC is operating, changes the road surface reaction force coefficient $K_2$ to a smaller value than when the ABS or the VSC is not operating. Information on the operating state of the ABS or the VSC is provided from a control device (not shown) of the ABS or a control device (not shown) of the VSC to the control device 4.

As described above, the control device 4 changes the road surface reaction coefficient $K_2$ in accordance with a plurality of parameters relating to the road surface reaction. As a specific way to change the road surface reaction coefficient $K_2$ according to the respective parameters, for example, a map may be used. That is, a map relating the road surface reaction coefficient $K_2$ to the each parameter may be stored in the memory 8, and the road surface reaction coefficient $K_2$ may be determined by referring to the map. Instead of this, the road surface reaction coefficient $K_{2V}$ corresponding to the vehicle speed V, the road surface reaction coefficient $K_{2\mu}$ corresponding to the road surface friction coefficient μ, the road surface reaction coefficient $K_{2\delta}$ corresponding to the turning angle δ, the road surface reaction coefficient $K_{2ABS}$ corresponding to the operating condition of ABS, the road surface reaction coefficient $K_{2VSC}$ corresponding to the operating condition of VSC, and the like may be set, respectively, and the road surface reaction coefficient $K_2$ may be calculated by the following equation.

$$K_2 = K_{2V} \times K_{2\mu} \times K_{2\delta} \times K_{2ABS} \times K_{2VSC}$$

According to the control system described above, when the change occurs in the road surface reaction due to the change in the running environment conditions, the road surface reaction coefficient $K_2$ of the transfer function describing the feed-forward model 32 is changed in accordance with the change in the road surface reaction. The change of the road surface reaction coefficient $K_2$ is carried out so as to reduce the difference between the target turning angle δ* and the actual turning angle δ. Accordingly, since the expansion of the deviation between the feed-forward model 32 and the actual turning system 31 due to changes in the running environment conditions is suppressed, it is possible to ensure the accuracy of the turning control with respect to changes in the running environment conditions.

The change of the road surface reaction coefficient $K_2$ may be performed after the deviation between the feed-forward model 32 and the actual turning system 31 is expanded to some extent. Specifically, the value of the road surface reaction coefficient $K_2$ may be fixed when the feedback value $i_{fb}*$ calculated by the feedback model 33 is less than a predetermined value, and the change of the road surface reaction coefficient $K_2$ may be performed on the condition that the feedback value $i_{fb}*$ becomes a predetermined value or more. According to this, it is possible to suppress frequent changes in the road surface reaction coefficient $K_2$ at the stage where the deviation between the feed-forward model 32 and the actual turning system 31 is small, and to ensure the stability of the control.

Figure 7:
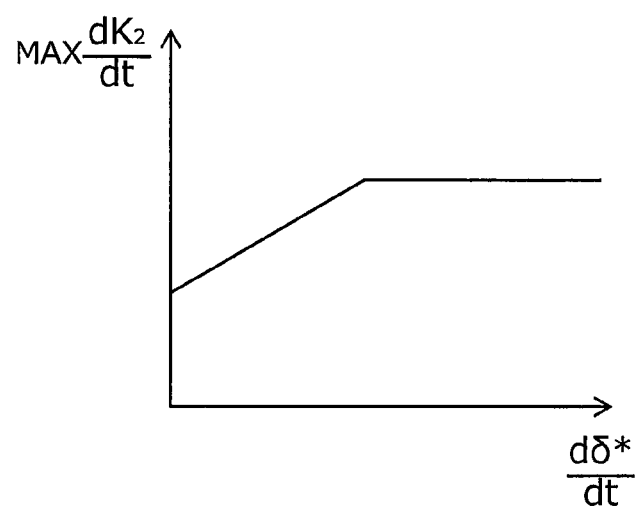
FIG. 7 is a diagram illustrating an example of setting a maximum change speed of road surface reaction force coefficient $K_2$.

In addition, when the road surface reaction coefficient $K_2$ is changed, a change speed at which the road surface reaction coefficient $K_2$ is changed (that is, the amount of change per unit of time) may be limited. FIG. 7 is a diagram illustrating an example of setting a maximum change speed of the road surface reaction coefficient $K_2$. In the example shown in FIG. 7, the maximum change speed of the road surface reaction coefficient $K_2$ is increased in accordance with an increase in the change speed of the target turning angle. However, when the change speed of the target turning angle exceeds a predetermined value, the maximum change speed of the road surface reaction coefficient $K_2$ is held at a constant value. In other words, the change speed of the road surface reaction coefficient $K_2$ is limited below the predetermined upper limit. Sudden changes in vehicle behavior is prevented by setting a limit to the change speed of the road surface reaction coefficient $K_2$.

Figure 8:
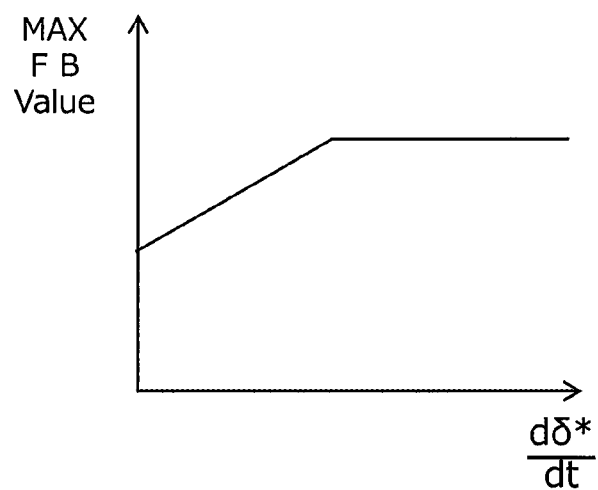
FIG. 8 is a diagram illustrating an example of setting a maximum value of feedback value.

When the vehicle is stopped or when the lateral acceleration acting on the vehicle is in a saturation region, stability is given priority to the turning control over the responsiveness. In such cases, after stopping the change of the road surface reaction coefficient $K_2$, the feedback value $i_{fb}^*$ calculated by the feedback model 33 may be limited to a predetermined upper limit or less, as shown in FIG. 8. By setting the upper limit, it is possible to maintain the stability of the turning control. Further, as shown in FIG. 8, when the change speed of the target turning angle is a predetermined value or less, the maximum value of the feedback value (the MAX FB value) may be increased in accordance with the change speed of the target turning angle in a range that does not exceed the upper limit.

What is claimed is:

1. The steering system for a vehicle comprises:
   a steering mechanism that is mechanically disconnected from a steering wheel to cause a driving wheel to be turned by a turning motor; and
   a control device that provides a motor command value to the turning motor, wherein the control device includes a two-degree-of-freedom control system comprising:
      a feed forward model for converting a target turning angle into a feed-forward value of the motor command value; and
      a feedback model for converting a difference between the target turning angle and an actual turning angle into a feedback value of the motor command value, the motor command value provided to the turning motor is the feedback value of the motor command value added to the feed-forward value of the motor command value, wherein
      a transfer function describing the feed forward model includes a variable coefficient, and
   wherein the control device is configured to change the variable coefficient based on information about road surface reaction.

2. The steering system according to claim 1, wherein the control device changes, when the feedback value becomes a predetermined value or more, the variable coefficient based on the information about the road surface reaction.

3. The steering system according to claim 2, wherein the control device limits change speed of the variable coefficient to a predetermined upper limit or less.

4. The steering system according to claim 3, wherein the control device increases maximum change speed of the variable coefficient in a range that does not exceed the upper limit in accordance with change speed of the target turning angle, when the change speed of the target steering angle is a predetermined or less.

5. The steering system according to claim 1, wherein, when the vehicle is stopped or when the lateral acceleration acting on the vehicle is in a saturation region,
   the change of the variable coefficient is stopped, and
   the feedback value is limited to a predetermined upper limit or less.

6. The steering system according to claim 5, wherein the control device increases a maximum value of the feedback value in a range that does not exceed the upper limit in accordance with a change speed of the target turning angle, when the change speed of the target turning angle is a predetermined value or less.

7. The steering system for a vehicle comprises:
   a steering mechanism that is mechanically disconnected from a steering wheel to cause a driving wheel to be turned by a turning motor; and
   a control device that provides a motor command value to the turning motor, wherein the control device includes a two-degree-of-freedom control system comprising:
      a feed forward model for converting a target turning angle into a feed-forward value of the motor command value; and
      a feedback model for converting a difference between the target turning angle and an actual turning angle into a feedback value of the motor command value, wherein
      a transfer function describing the feed forward model includes a variable coefficient,
   wherein the control device is configured to change the variable coefficient based on information about road surface reaction, and
   wherein, when the vehicle is stopped or when the lateral acceleration acting on the vehicle is in a saturation region, the change of the variable coefficient is stopped.

8. The steering system according to claim 7, wherein the control device changes, when the feedback value becomes a predetermined value or more, the variable coefficient based on the information about the road surface reaction.

9. The steering system according to claim 8, wherein the control device limits change speed of the variable coefficient to a predetermined upper limit or less.

10. The steering system according to claim 9, wherein the control device increases maximum change speed of the variable coefficient in a range that does not exceed the upper limit in accordance with change speed of the target turning angle, when the change speed of the target steering angle is a predetermined or less.

11. The steering system according to claim 7, wherein, when the vehicle is stopped or when the lateral acceleration acting on the vehicle is in a saturation region,
    the feedback value is limited to a predetermined upper limit or less.

12. The steering system according to claim 11, wherein the control device increases a maximum value of the feedback value in a range that does not exceed the upper limit in accordance with a change speed of the target turning angle, when the change speed of the target turning angle is a predetermined value or less.

13. The steering system for a vehicle comprises;
    a steering mechanism that is mechanically disconnected from a steering wheel to cause a driving wheel to be turned by a turning motor; and
    a control device that provides a motor command value to the turning motor, wherein the control device includes a two-degree-of-freedom control system comprising;
       a feed forward model for converting a target turning angle into a feed-forward value of the motor command value; and
       a feedback model for converting a difference between the target turning angle and an actual turning angle into a feedback value of the motor command value, wherein
       a transfer function describing the feed forward model includes a variable coefficient,
    wherein the control device is configured to change the variable coefficient based on information about road surface reaction,
    wherein, when the vehicle is stopped or when the lateral acceleration acting on the vehicle is in a saturation region, the feedback value is limited to a predetermined upper limit or less.

14. The steering system according to claim 13, wherein the control device changes, when the feedback value becomes a predetermined value or more, the variable coefficient based on the information about the road surface reaction.

15. The steering system according to claim 14, wherein the control device limits change speed of the variable coefficient to a predetermined upper limit or less.

16. The steering system according to claim 15, wherein the control device increases maximum change speed of the variable coefficient in a range that does not exceed the upper limit in accordance with change speed of the target turning angle, when the change speed of the target steering angle is a predetermined or less.

17. The steering system according to claim 13, wherein the control device increases a maximum value of the feedback value in a range that does not exceed the upper limit in accordance with a change speed of the target turning angle, when the change speed of the target turning angle is a predetermined value or less.

* * * * *